(12) United States Patent
Aoki et al.

(10) Patent No.: US 6,626,763 B2
(45) Date of Patent: Sep. 30, 2003

(54) DRIVE SHAFT

(75) Inventors: Hidekazu Aoki, Kanagawa (JP); Naomi Morinaga, Saitama (JP)

(73) Assignee: Unisia Jecs Corporation, Kanagawa-Ken (JP)

( * ) Notice: Subject to any disclaimer, the term of this patent is extended or adjusted under 35 U.S.C. 154(b) by 0 days.

(21) Appl. No.: 09/875,147

(22) Filed: Jun. 7, 2001

(65) Prior Publication Data

US 2002/0006831 A1 Jan. 17, 2002

(30) Foreign Application Priority Data

Oct. 11, 2000 (JP) ........................................ 2000-310060
Jun. 7, 2000 (JP) ........................................ 2000-171048

(51) Int. Cl.⁷ ................................................ F16D 3/78
(52) U.S. Cl. ............................ 464/99; 464/94; 464/182
(58) Field of Search ........................... 464/99, 179, 180, 464/182, 93, 94, 137

(56) References Cited

U.S. PATENT DOCUMENTS

| 1,328,893 | A | * | 1/1920 | Patrick | 464/93 |
| 1,550,458 | A | * | 8/1925 | Schell | 464/94 |
| 1,588,424 | A | * | 6/1926 | Jencick | 464/93 |
| 2,214,293 | A | * | 9/1940 | D'Aubarede | 464/94 |
| 3,108,457 | A | * | 10/1963 | Weasler | 464/94 |
| 3,478,539 | A | * | 11/1969 | Hans-Karl | 464/93 |
| 4,114,472 | A | * | 9/1978 | Hornig et al. | 464/94 |
| 4,188,802 | A | | 2/1980 | Zeidler et al. | |
| 5,562,545 | A | | 10/1996 | Wahling et al. | |
| 6,022,047 | A | * | 2/2000 | Okubo | 464/180 |
| 6,068,555 | A | * | 5/2000 | Andra et al. | 464/93 |
| 6,102,807 | A | * | 8/2000 | Barrett et al. | 464/180 |
| 6,113,499 | A | | 9/2000 | Braun et al. | |

FOREIGN PATENT DOCUMENTS

| JP | 60-189620 | 12/1985 |
| JP | 63-178632 | 11/1988 |

* cited by examiner

Primary Examiner—Lynne H. Browne
Assistant Examiner—Kenn Thompson
(74) Attorney, Agent, or Firm—Sughrue Mion, PLLC

(57) ABSTRACT

A drive shaft for transmitting an engine revolution to a rear axle of a motor vehicle comprises, a first shaft comprising a first yoke fixed to an end of the first shaft, a second shaft comprising a second yoke fixed to an end of the second shaft. The second yoke being made of a metal plate by press-forming. A coupling is provided between the first yoke and the second yoke, the coupling having a high-rigidity in a rotating direction of the drive shaft and having an elasticity in an axial direction of the drive shaft.

4 Claims, 9 Drawing Sheets

DRIVE SHAFT

BACKGROUND OF THE INVENTION

This invention relates to a drive shaft for a motor vehicle, especially plural shafts are connected together by a coupling that absorbs an oscillation of the drive shaft in an axial direction of the drive shaft. Since the drive shaft frequently receives an oscillation in the axial direction, the coupling is provided between the shafts in order to absorb the oscillation that would cause a vibration of a motor vehicle.

This type of drive shaft generally is known. For example, relevant related art is disclosed in Japan Utility model publication (koukai) No. 63-178632. This publication discloses an output shaft, an input shaft and a coupling. One end of the output shaft is connected to a transmission of a motor vehicle and one end of the input shaft is connected to a rear axle of the motor vehicle. The other end of the output shaft and the other end of the input shaft are connected together through the coupling. According to this publication, the coupling is made of rubber material.

As shown in FIGS. 10 and 11 illustrating a relevant related art, a coupling comprises a main body 1 made of rubber material and formed in an annular shape. Six bushings 2 are provided on an outer periphery of the main body 1 so that all of the bushings are provided in the same interval in a circumferential direction. Every mutually adjoining two bushings 2 are connected together by a wire 8 made from a material that has a high-rigidity, for example, glass fiber. A first yoke 5 that has three arm portions 5a is fixed to an end of an output shaft 3. A second yoke 6 that has three arm portions 6a is fixed to an end of an input shaft 4. The yokes 5 and 6 are formed by forging. The arm portions 5a and 6a are fixed to the bushings 2 by bolts 12 so that the bushings 2 are fixed alternately to the arm portions 5a and 6a in the circumferential direction. The end of the output shaft 3 extends through a center of the main body 1 and is supported by supporting rubber 7 provided on the yoke 6 so that an axis of the output shaft 3 and an axis of the input shaft 4 coincide.

According to this type of coupling, every mutually adjoining two bushings 2 are connected together by the wire 8 and the main body 1 is made of rubber material. Hence, a relative displacement between the output shaft 3 and the input shaft 4 in an axial direction of the input shaft 4 is permitted by the main body 1 while a revolution of the output shaft 3 is transmitted to the input shaft 4 without losing power by virtue of the tension of the wire 8.

However, since a structure of this type of coupling tends to be complicated, and thus, a size of this type of coupling become large, another type of coupling that has an annular plate instead of the rubber material as the main body has been provided. This type of coupling is disclosed in, for example, Japan Utility model publication (koukai) No. 60-189620. The annular plate of this type of coupling is also shown in FIG. 12 of the present invention.

As shown in FIG. 12, an annular plate 9 has six hole portions 10. The hole portions 10 are provided in an outer periphery of the annular plate 9 so that all of the hole portions are provided in the same interval in a circumferential direction of the annular plate 9. Three arm portions 12 of a first yoke (not shown) are provided on an output shaft (not shown) and three arm portions 13 of a second yoke (not shown) are provided on an input shaft (not shown). The arm portions 12 and 13 are fixed to the annular plate 9 by bolts (not shown) so that each arm portion 12 and 13 is fixed alternately to the annular plate 9 in the circumferential direction of the annular plate 9. The annular plate 9 is made of metal that has a rigidity and is formed so that a thickness in an axial direction of the annular plate 9 is equal at all portions. There are provided washers 11 on the hole portions 10.

Assuming that a portion connecting every mutually adjoining two holes 10 is called connecting arm portions 9a, the connecting arm portions 9a absorb oscillation that occurs in an axial direction of the output shaft and transmit a revolution of the output shaft to the input shaft without losing power. Further, since the annular plate 9 is made of material that has a rigidity, the output shaft and the input shaft are connected so that both axes of the output shaft and the input shaft coincide without adding any means for arranging the axis of one of the output shaft and the input shaft to the axis of the other of the output shaft and the input shaft.

However, since both yokes are formed by forging, each yoke tends to be heavy and some after-processes, such as a drilling process for making the hole portions 10 and a cutting process for providing a flat surface at which the yoke is connected to the coupling, are necessary. As a consequence, a drive shaft tends to be heavy and expensive.

SUMMARY OF THE INVENTION

Accordingly, in view of above-described problems encountered in the related art, a principal object of the present invention is to provide a drive shaft that has a lightweight yoke.

Another object of the present invention is to provide a drive shaft that has an easily assembled yoke and coupling.

Still another object of the present invention is to provide an inexpensive drive shaft that has durability.

In order to achieve these and the other objects, there is provided a drive shaft that comprises a first shaft comprising a first yoke fixed to an end of the first shaft, a second shaft comprising a second yoke fixed to an end of the second shaft. The second yoke being made of a metal plate by press-forming. A coupling is provided between the first yoke and the second yoke. The coupling has a high-rigidity in a rotating direction of the drive shaft and has an elasticity in an axial direction of the drive shaft.

Other aspects and advantages of the invention will become apparent from following description, taken in conjunction with the accompanying drawings, illustrating by way of example the principle of the invention.

DETAILED DESCRIPTION OF THE PREFERRED EMBODIMENTS

A drive shaft according to a preferred embodiment of the present invention will now be described with reference to the drawings.

Figure 1:
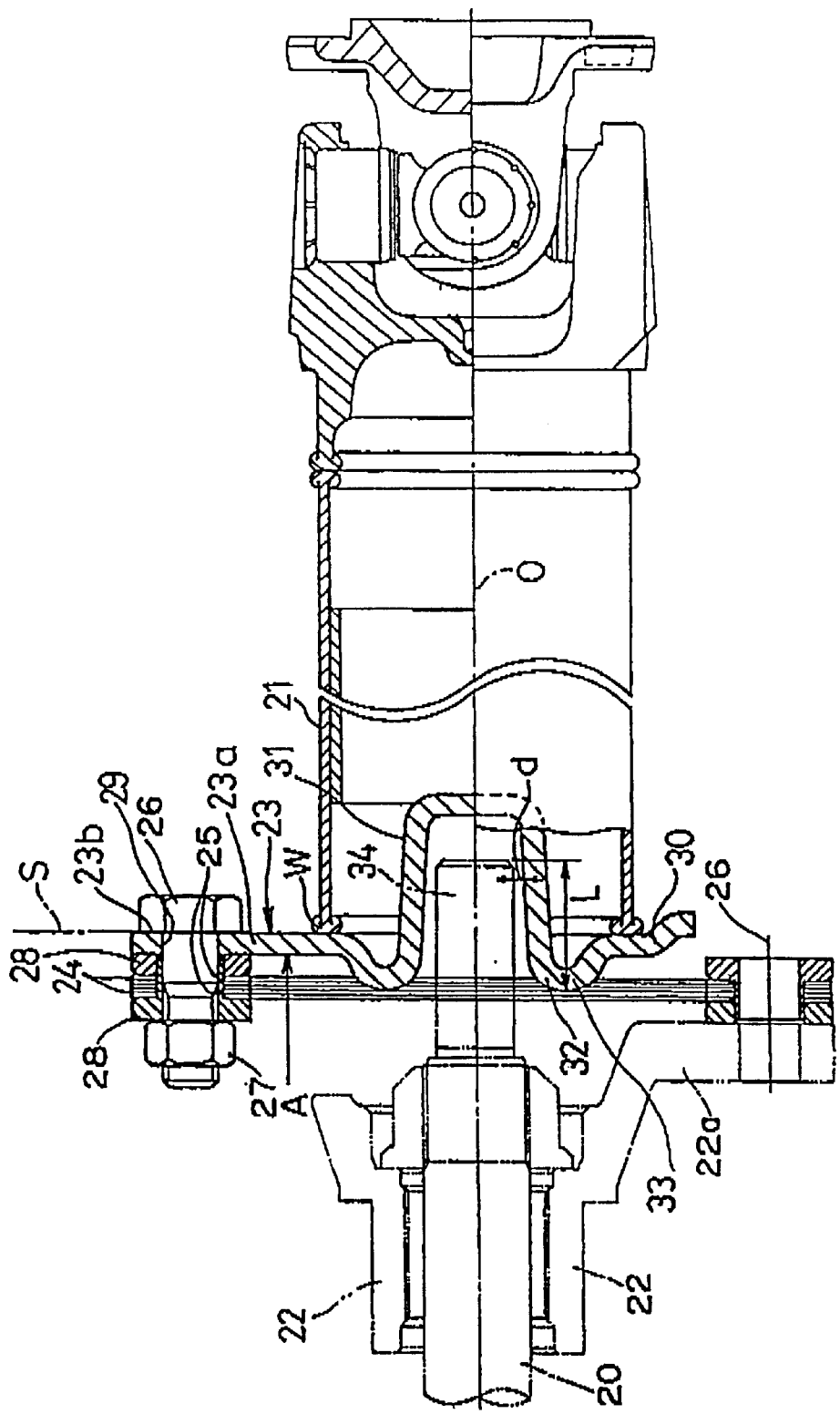
FIG. 1 is a vertical sectional drawing, showing a coupling which is connected to a yoke of a drive shaft according to the first embodiment of the present invention.

As shown in FIG. 1, a first yoke 22 is provided on an end of an output shaft 20 of a transmission (not shown), and a second yoke 23 is provided on an end of a main shaft 21. The first yoke 22 is formed by forging and is fixed to the end of the output shaft 20. The second yoke 23 is formed by press-forming and is fixed to the end of the main shaft 21 by welding. Each yoke 22 and 23 has radially extending three arm portions 22a and 23a. The arm portions 22a are provided so that each arm portion 22a is placed in the same interval, and the arm portions 23a are provided so that each arm portion 23a is placed in the same interval. There are provided plural annular plates 24, which constitute a coupling that absorbs oscillation that occurs in an axial direction of the main shaft 21, between the first yoke 22 and the second yoke 23, and the first yoke 22 and the second yoke 23 are connected through the annular plates 24.

Figure 2:
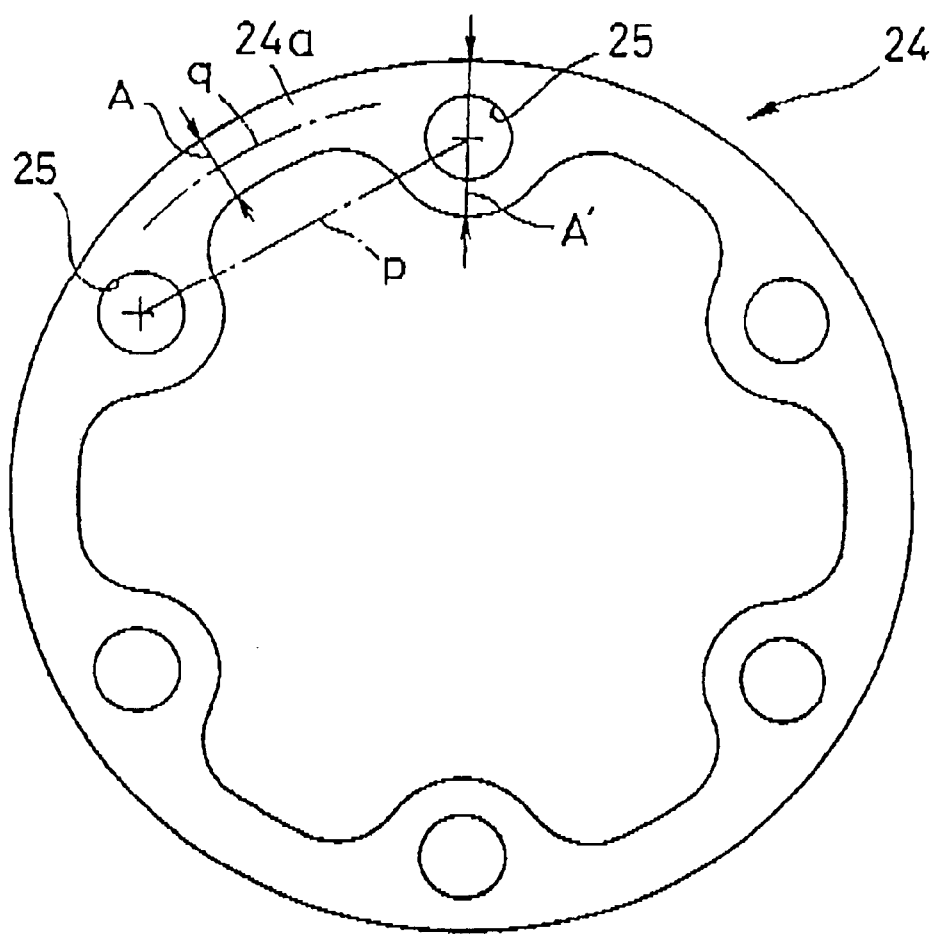
FIG. 2 is a side view of an annular plate as a coupling of FIG. 1.

As shown in FIGS. 1 and 2, each annular plate 24 has six holes 25 in the same interval of a circumferential direction of the annular plate 24. The arm portions 22a are placed on the holes 25 of one side of the annular plate 24, and the arm portions 23a are placed on the holes 25 of the other side of the annular plate 24, in order that the arm portions 22a and the arm portions 23a are placed alternately on the holes 25. There are provided washers 28 on each bole 25 so that the annular plates 24 are pinched between the washers 28 in the axial direction of the main shaft 21. Each arm portion 22a and 23a is fixed to the annular plate 24 by a bolt 26 and a nut 27 through the hole 25.

The annular plate 24 is formed so that a width A of connecting arm portions 24a, which are provided between mutually adjoining holes 25, is shorter than a width A' of hole portions at which the holes 25 are provided. Also, an inner diameter of the annular plate 24 at the hole portion is made shorter than an inner diameter at the connecting arm portion 24a, while the same outer diameter is provided at a whole portion of the annular plate 24. Thereby, a center line q of the connecting arm portion 24a is placed outside of an imaginary line p, which connects two centers of the holes 25 that are adjoining each other. That is, the width A of the connecting arm portion 24a is made shorter than the width A' of the hole portion 25, and a length of the connecting arm portion 24a is made longer than a length of the imaginary line p and a circumference of a pitch circle running through centers of the holes 25. Consequently, a rigidity of the annular plate 24 in the axial direction of the main shaft 21 is decreased, and thus the annular plate 24 absorbs the oscillation that occurs in the axial direction of the main shaft 21. Although a rigidity of the annular plate 24 in a circumferential direction of the annular plate 24 is decreased for the similar reason, a decrease of the rigidity in the circumferential direction can be realized increasing the number of the annular plates 24.

Figure 3:
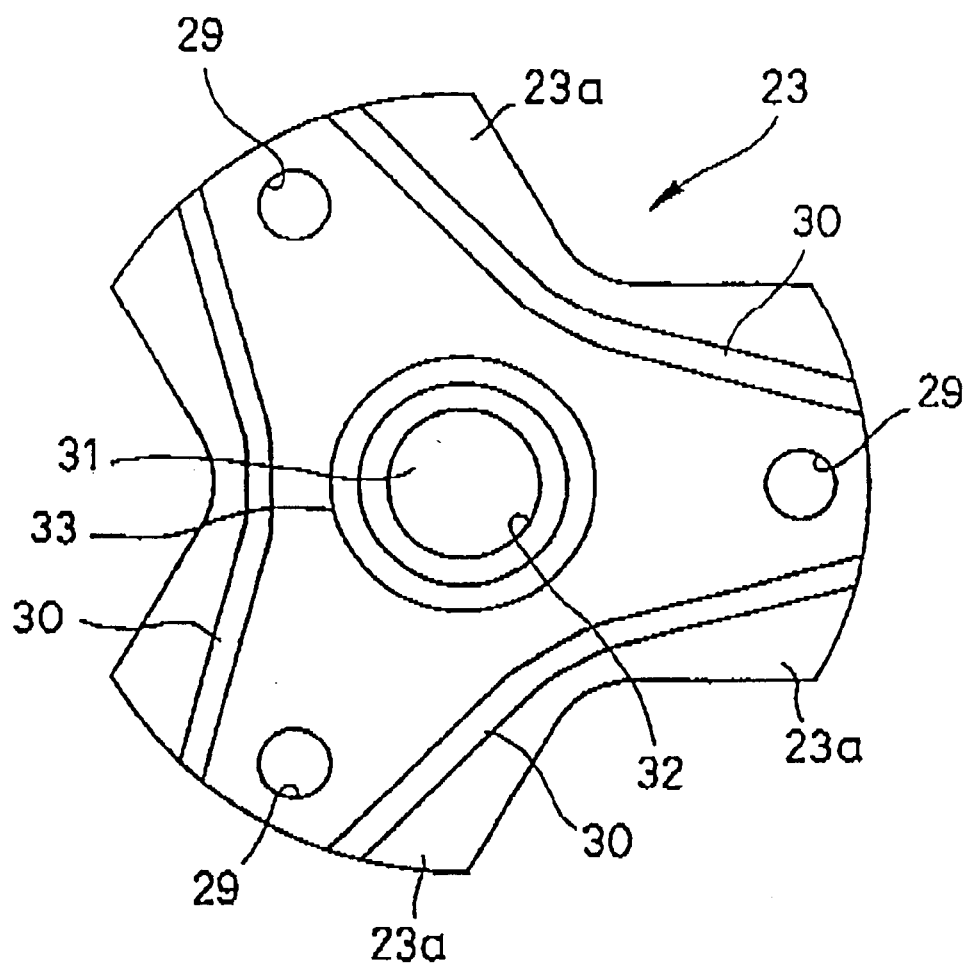
FIG. 3 is a side view of a yoke, taken from arrow A of FIG. 1.

As shown in FIGS. 1 and 3, a hole 29 into which the bolt 26 is inserted is provided on each arm portion 23a. A rib portion 30 is provided on the second yoke 23 so that the rib portion 30 is formed along a side of the arm portion 23a and connects the rib portion 30, which is provided on an adjoining another arm portion 23a, at a root portion of the arm portion 23a. The rib portion 30 is constituted by a curving portion that is curved toward an opposite direction to the annular plate 24. Thereby, touches between the second yoke 23 and the annular plate 24 that would cause an age degradation of both the second yoke 23 and the annular plate 24 are prevented even if the annular plate 24 is deformed by flexure that might be caused by a displacement between the output shaft 20 and the main shaft 21. Therefore, the annular plates 24 are able to have a stable oscillation absorbing performance. The rib portion 30 is placed so that a flat surface is provided at the each hole 29.

As shown in FIG. 1, the second yoke 23 is fixed to the main shaft 21 by welding so that a fixing portion W of the second yoke 23 at which the second yoke 23 is fixed to the main shaft 21 and a surface 23b at which a head of the bolt 26 is placed are provided on the same surface. That is, the surface 23b and the fixing portion W are on the same surface S of the second yoke 23.

Both the surface 23b and the fixing portion W are on the surface S that is vertical to an axial line O of the main shaft 21. Thereby, torque transmitted to the second yoke 23 via the bolts 26 and the annular plates 24 is transmitted to the main shaft 21 without affecting a torsional deformation to the second yoke 23. Although the second yoke 23 is made of a metal plate by press-forming, the second yoke 23 transmits torque to the main shaft 21 without deforming undesirably. Therefore, an age degradation caused by the torsional deformation can be prevented.

The rib portion 30 is formed on an outside of the fixing portion W in a radial direction of the second yoke 23 in order that a flat surface is provided at the hole 29. That is, the rib portion 30 is provided on a portion of the second yoke 23 other than the fixing portion W and the holes 29. Thereby, a rigidity of the second yoke 23 is increased, whereas a decrease of weld strength between the second yoke 23 and the main shaft 21, a decrease of fixing strength between the second yoke 23 and the annular plates 24, and a decrease of a reinforcing effect of the rib portion 30 is prevented.

There is provided a cylindrical portion 31, which is formed integrally with the second yoke 23, at a center of the second yoke 23. The cylindrical member 31 has a bottom surface and an opening 32, which opens toward the annular plate 24, and is placed so that the cylindrical member 31 is accommodated in the main shaft 21. Thereby, an intrusion of foreign matter, such as mud and water, into an inside of the main shaft 21 is prevented.

According to the first embodiment of the present invention, a rib portion 33 is provided on an outer periphery of the opening 32. The rib portion 33 is constituted by a convex portion protruding from the surface facing to the annular plate 24. An inner surface of the cylindrical portion 31 is provided with a tapered surface so that a diameter of the inner surface decreases toward the bottom surface. Thereby, the foreign matter entered into an inside of the cylindrical portion 31 is discharged along the tapered surface without accumulating, and thus, a degradation of the main shaft 21 caused by the foreign matter can be prevented.

A shape of the second yoke 23, the holes 29, the cylindrical portion 31 and the rib portions 30 and 33 are formed by press forming. Therefore, the weight of the second yoke 31 can be decreased compared to a yoke formed by forging, and some after-processes, such as a drilling process for making the hole portions and a cutting process for providing a flat surface at which the yoke is connected to the coupling, are not necessary. As a consequence, an inexpensive drive shaft can be provided.

A rod portion 34 is provided on the output shaft 20. The rod portion 34 protrudes from an end of the output shaft 20 and penetrates through a center of the annular plate 24. An end of the rod portion 34 is accommodated in the cylindrical portion 31 so that a length L of the rod portion 24 in the cylindrical portion 31 is longer than an axial maximum displacement between the output shaft 20 and the main shaft 21 caused by an axial oscillation of the main shaft 21.

A gap D is provided between an inner surface of the cylindrical portion 31 and an outer surface of the rod portion 34 in order to avoid touching of the rod portion 34 to the inner surface of the cylindrical portion 31 even when one of the output shaft 20 and the main shaft 21 relatively moves with respect to the other of the output shaft 20 and the main shaft 21 in the axial direction of the main shaft 21. Accordingly, a sliding resistance caused by a relative movement between the output shaft 20 and the main shaft 21 in the axial direction of the main shaft 21 can be prevented. Further, a degradation of an oscillation absorbing performance can be prevented. Consequently, a torque of the output shaft 20 is transmitted to the main shaft 21 via the first yoke 22, the annular plate 24 and the second yoke 23 without loss, while the axial oscillation is absorbed by an axial elasticity of the annular plate 24.

Next, the drive shaft according to the second embodiment of the present invention will be described, referring FIG. 4. Parts of this embodiment are given the same reference characters to corresponding parts of the first embodiment, and only differences from the first embodiment will be described.

Figure 4:
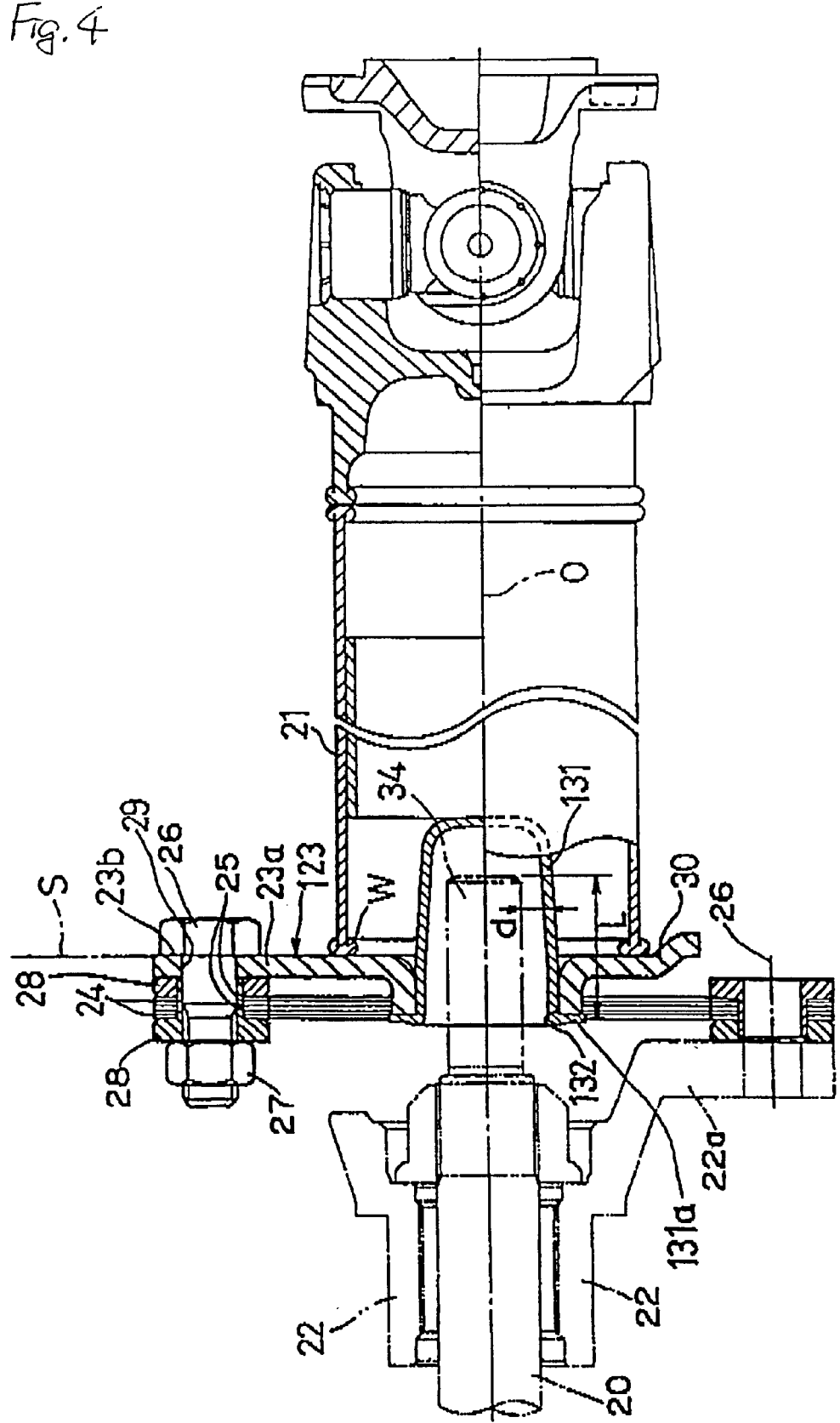
FIG. 4 is a vertical sectional drawing, showing a coupling which is connected to a yoke of a drive shaft according to the second embodiment of the present invention.

In this embodiment, as shown in FIG. 4, there is provided a cylindrical portion 131, which is provided separately with the second yoke 123, at a center of the second yoke 123. An opening 132 whose periphery is curved cylindrically in the axial direction of the main shaft 21 and protruding toward the output shaft 20 is provided at a center of the second yoke 123. The cylindrical portion 131 is made of a metal plate by press-forming. The cylindrical portion 131 has a bottom surface.

An inner surface of the cylindrical portion 131 is provided with a tapered surface in order that a diameter of the cylindrical portion 131 decreases toward the bottom surface. A flange portion 131a, which is curved in a radial direction of the cylindrical portion 131, is provided on an end of the cylindrical portion 131. The second yoke 123 has a hole at the center of the second yoke 123, and the cylindrical portion 131 is inserted into the hole from the bottom surface of the cylindrical portion 131 by press-fitting so that the cylindrical portion 131 is accommodated in the main shaft 21. That is, an outer surface of the cylindrical portion 131 touches an inner surface of the peripheral portion of the opening 132, while an end of the outer periphery of the opening 132 and the flange portion 131a are fixed together by welding.

Since the cylindrical portion 131 is provided separately with the second yoke 123, the cylindrical portion 131 can be made of a thinner metal plate than a metal plate of the second yoke 123. Thereby, a decrease of a weight of the second yoke 123 can be provided. Further, an easy processing of the cylindrical portion 131 can also be provided. Moreover, since the cylindrical portion 131 is formed separately with the second yoke 123, the cylindrical portion 131 that has an accurate size can be formed.

According to the second embodiment of the present invention, while the cylindrical portion 131 is fixed to the second yoke 123 by both press-fitting and welding, the cylindrical portion 131 may also be fixed to the second yoke 123 by only press-fitting.

Next, the drive shaft according to the third embodiment of the present invention will be described, referring FIGS. 5 and 6. Parts of this embodiment are given the same reference characters to corresponding parts of the first and the second embodiments, and only differences from the first and the second embodiments will be described.

Figure 5:
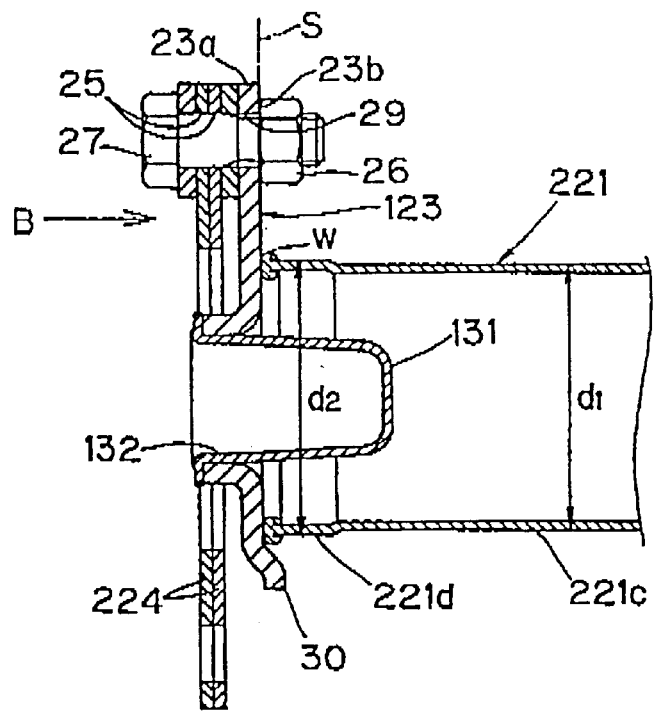
FIG. 5 is a vertical sectional drawing, showing a yoke and a coupling according to an example of the third embodiment of the present invention.

In this embodiment, as shown in FIG. 5, a large diameter portion 221d is provided on an end of a main shaft 221 at which the second yoke 123 is fixed to the main shaft 221 by welding. A diameter d2 of the large diameter portion 221d is being larger than a diameter d1 of an other portion 221c of the main shaft 221. The large diameter portion 221d is formed by plasticity-forming.

Figure 6:
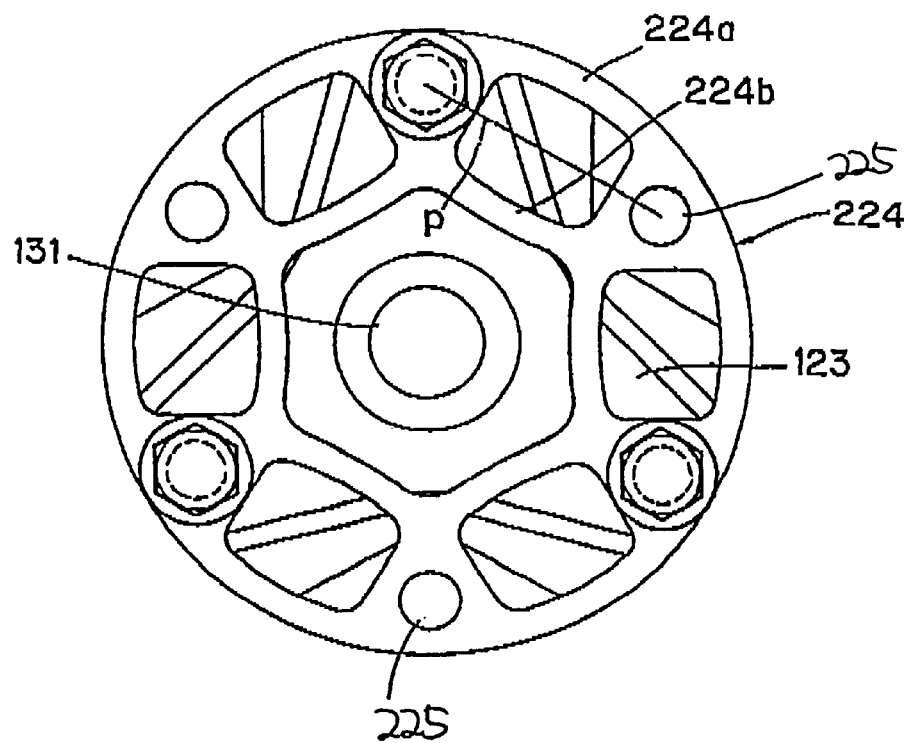
FIG. 6 is a side view of an annular plate, taken from arrow B of FIG. 5.

As shown in FIG. 6, an annular plate 224 has connecting arm portions 224a and 224b provided between mutually adjoining holes 225. The connecting arm portion 224a is being placed an outside of an imaginary line p, which connects two centers of the holes 225 that are adjoining each other, in a radial direction of the annular plate 224. The connecting arm portion 224b is placed an inside of the imaginary line p in the radial direction of the annular plate 224. The connecting arm portion 224a and the connecting arm portion 224b are symmetrical at the imaginary line p.

According to the third embodiment of the present invention, since the main shaft 221 and the second yoke 123 are fixed together at the large diameter portion 221d of the main shaft 221, a large welding area can be provided, and thus, the strength of the welding between the main shaft 221 and the second yoke 123 can be increased. Further, since the other portion 221c of the main shaft 221 is provided with a diameter d1, which is smaller than a diameter d2 of the large diameter portion 221d, an increase of a weight of the main shaft 221 can be avoided obtaining the same strength of the welding between a main shaft which has the diameter d2 at all portions of the main shaft and the second yoke 123.

Figure 7:
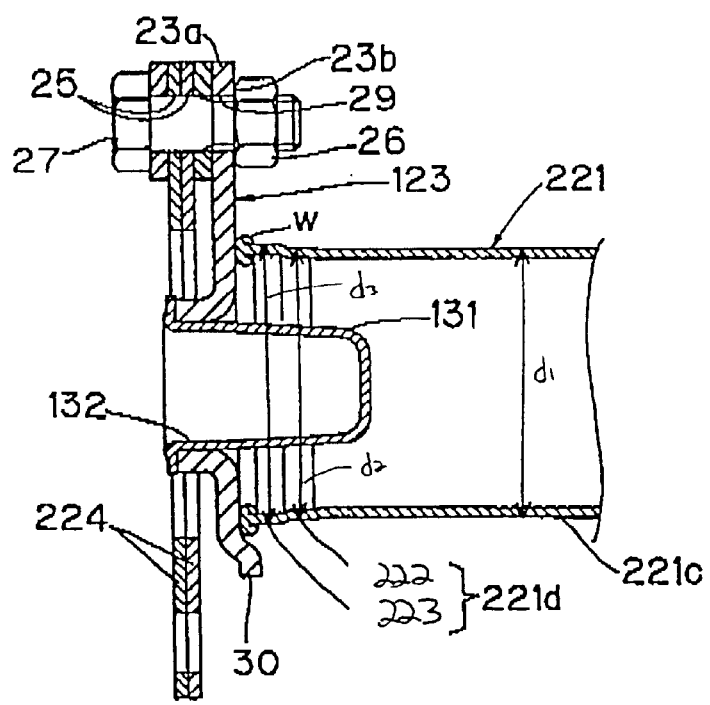
FIG. 7 is a vertical sectional drawing, showing a yoke and a coupling according to an another example of the third embodiment of the present invention.

While the third embodiment of the present invention shows that the main shaft 221 has two diameter portions d1 and d2, the drive shaft may also have plural diameter portions. In this case, as shown in FIG. 7, the large diameter portion 221d comprises from a first large diameter portion 222 and a second large diameter portion 223. A diameter d2 of the first large diameter portion 222 is larger than a diameter d1 of the other portion 221c of the main shaft 221 and smaller than a diameter d3 of the second large diameter potion 223.

According to the another example of the third embodiment, since the large diameter portion 221d is provided with two large diameter portions 222 and 223 in order that a diameter of the main shaft 221 increases toward an end of the main shaft 221 at which the second yoke 123 is fixed to the main shaft 221, a thin thickness portion of the main shaft 221 can be prevented from locally making at a root portion of the large diameter portion 221d, and thus, an even thickness of the main shaft 221 can easily provide on whole portions of the main shaft 221, when the large diameter portion 221d is formed.

Next, the drive shaft according to the fourth embodiment of the present invention will be described, referring FIG. 8. Parts of this embodiment are given the same reference characters to corresponding parts of the first, second and third embodiments, and only differences from the first, second and third embodiments will be described.

Figure 8:
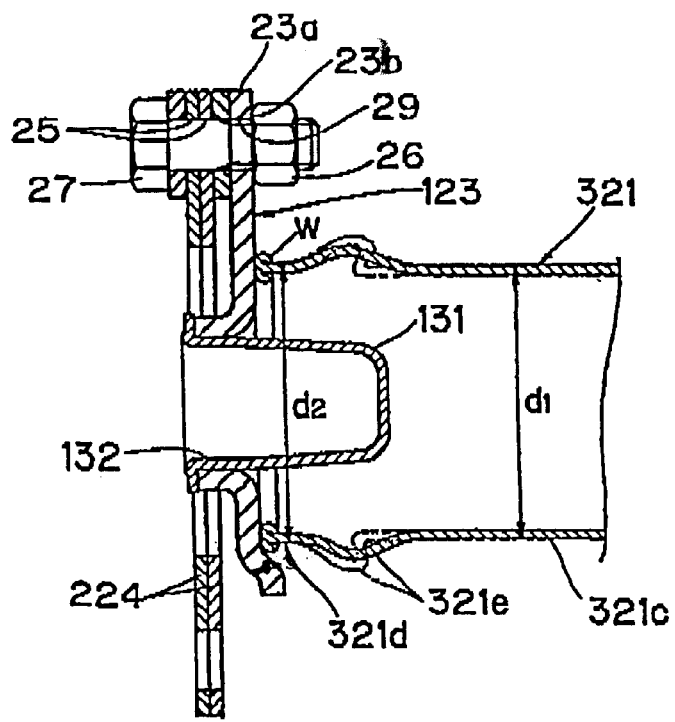
FIG. 8 is a vertical sectional drawing, showing a yoke and a coupling according to the fourth embodiment of the present invention.

In this embodiment, as shown in FIG. 8, a convex portion 321e is provided between a large diameter portion 321d and an other portion 321c of the main shaft 321. The convex portion 321e is formed so that a diameter of the convex portion 321e is larger than the diameter d2 of the large diameter portion 321d. The convex portion 321e is provided with a surface that runs smoothly between the large diameter portion 321d and the other portion 321c of the main shaft 321.

According to the fourth embodiment of the present invention, although the convex portion 321e retains its shape under a normal operation, the convex portion 321e is deformed, as shown a broken line in FIG. 8, when the main shaft 321 receives an extreme shock in an axial direction of the main shaft 321. Thereby, the extreme shock is effectively absorbed by a deformation of the convex portion 321e. Further, since the second yoke 123 is fixed to the large diameter portion 321d of the main shaft 321, a large welding area W can be provided, and thus, the strength of welding between the main shaft 321 and the second yoke 123 can be increased.

Next, the drive shaft according to the fifth embodiment of the present invention will be described, referring FIG. 9. Parts of this embodiment are given the same reference characters to corresponding parts of the first, second, third and fourth embodiments, and only differences from the first, second, third and fourth embodiments will be described.

Figure 9:
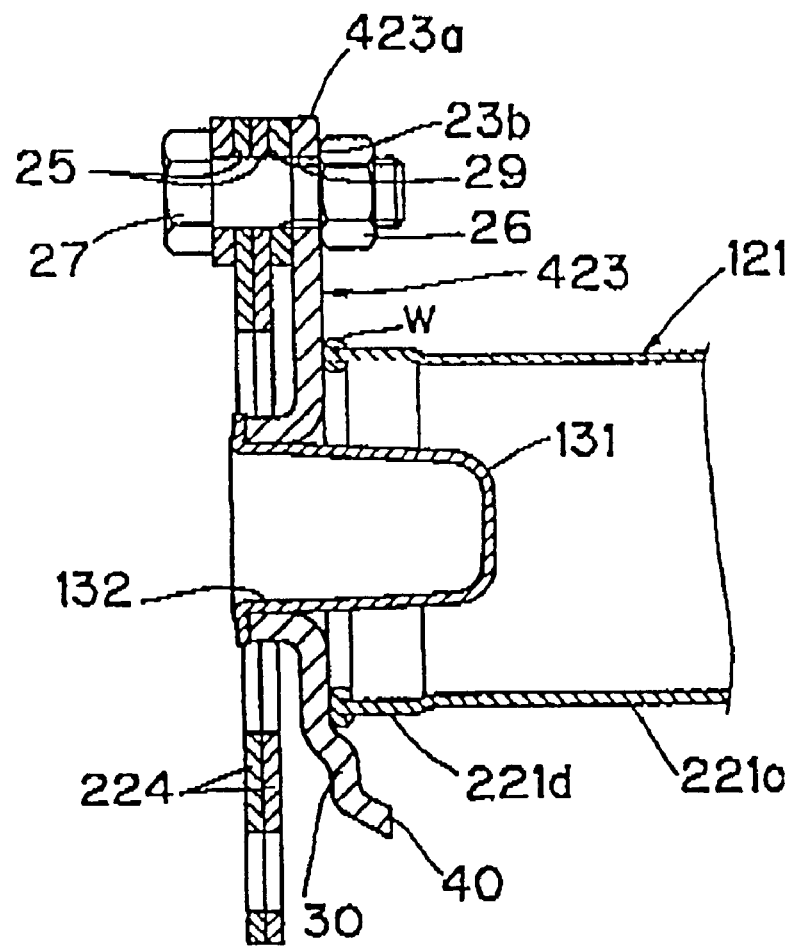
FIG. 9 is a vertical sectional drawing, showing a yoke and a coupling according to the fifth embodiment of the present invention.
Figure 10:
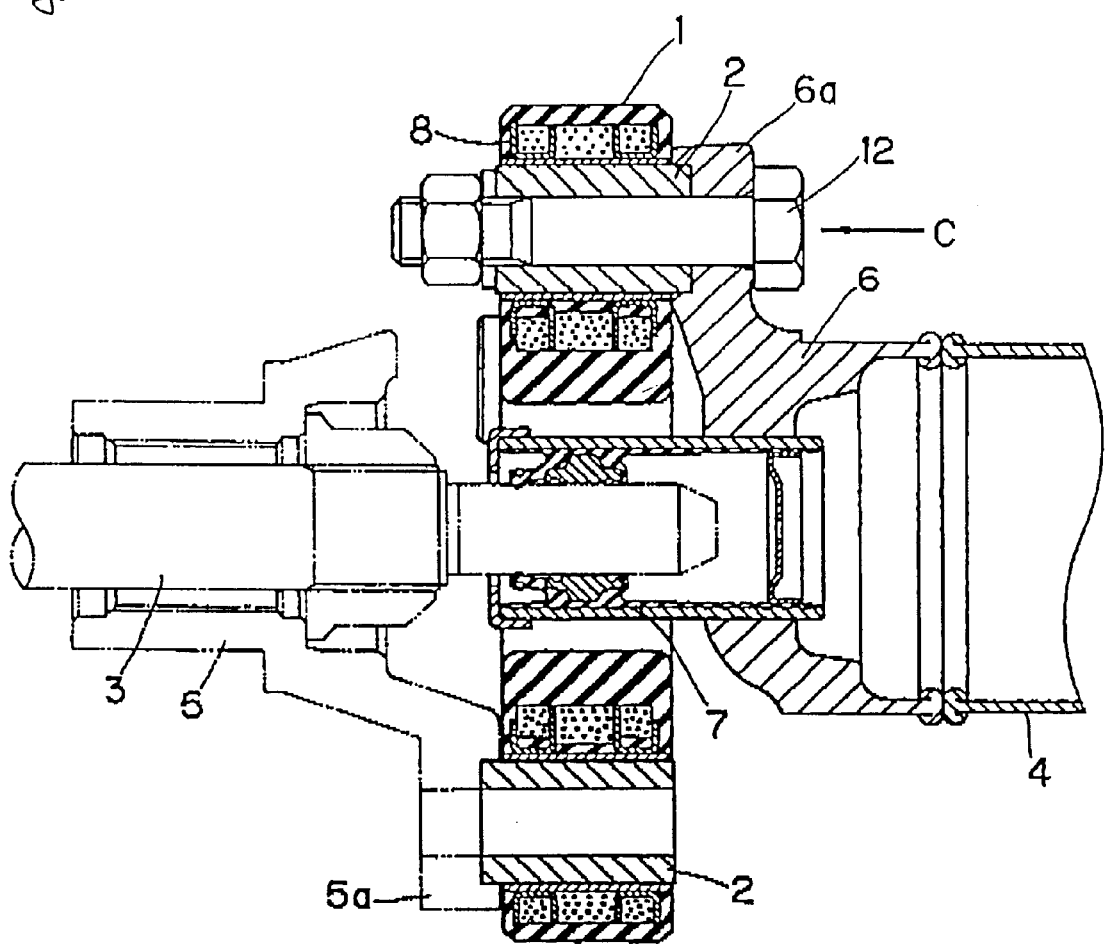
FIG. 10 is a vertical sectional drawing, showing a coupling which is connected to a yoke of a drive shaft of a related art.
Figure 11:
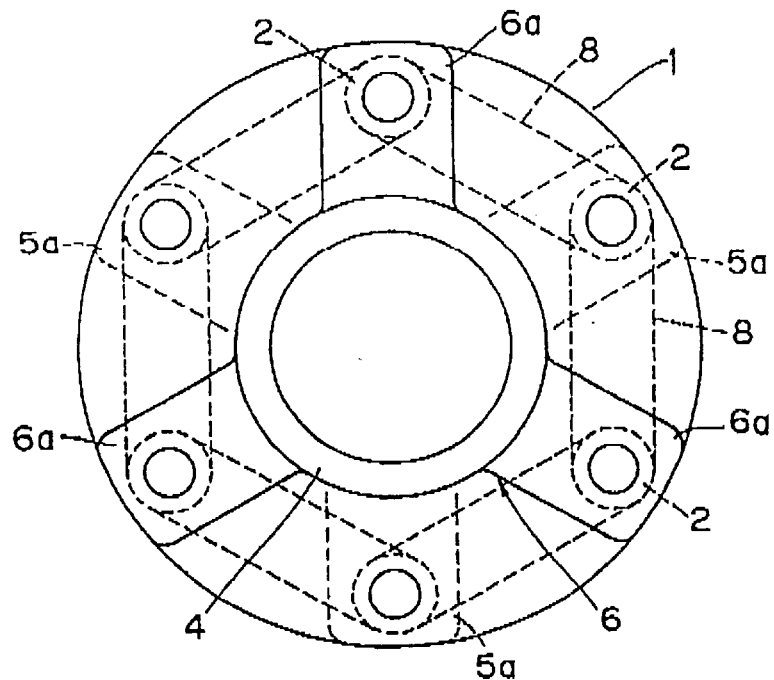
FIG. 11 is a side view of a coupling, taken from arrow C of FIG. 10.
Figure 12:
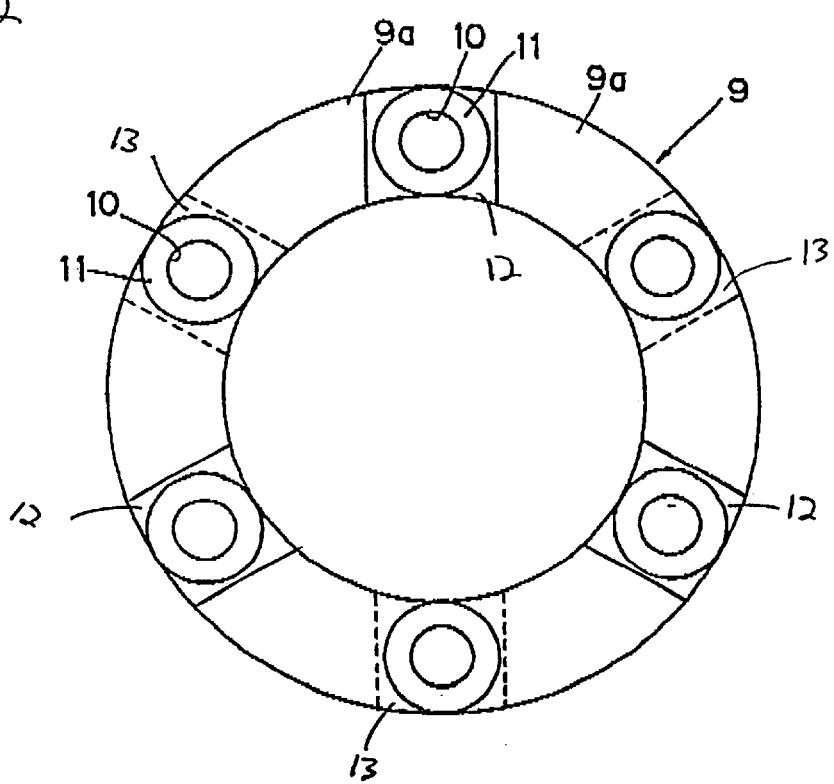
FIG. 12 is a side view of an annular plate of an another related art.

In this embodiment, as shown in FIG. 9, a second rib portion 40 is provided outside of the first rib portion 30 in a radial direction of a second yoke 423. The second rib portion 40 constitutes a curved portion of the second yoke 423 that is parallel curved to the first rib portion 30 in an axial direction of the main shaft 121. Thereby, the rigidity of the second yoke 421 can be increased.

The present embodiments are to be considered as illustrative and not restrictive and the invention is not to be limited to the details given herein, but may be modified.

While the present invention is disclosed on the basis of certain preferred embodiments, it in not limited thereto, but is defined by the appended claims as interpreted in accordance with applicable law.

This application relates to and incorporates herein by reference Japanese Patent application No. 2000-171048 filed on Jun. 7, 2000 and Japanese Patent application No. 2000-310060 filed on Oct. 11, 2000, from which priority is claimed.

What is claimed is:

1. A drive shaft for transmitting an engine revolution to a rear axle of a motor vehicle comprising:
   a first shaft;
   a first yoke fixed to an end of said first shaft;
   a second shaft;
   a second yoke fixed to an end of said second shaft, said second yoke being made of a press-formed metal plate; and
   a coupling provided between said first yoke and said second yoke, said coupling having a high-rigidity in a rotating direction of said drive shaft and having an elasticity in an axial direction of said drive shaft,
   wherein a first fixed portion is provided at which said second yoke is fixed to the end of said second shaft, and a second fixed portion is provided at which said second yoke is fixed to said coupling, said first fixed portion and said second fixed portion are provided at a same perpendicular plane to an axis of rotation,
   wherein said coupling comprises plural annular plates,
   wherein said first drive shaft further comprises a rod portion extending from said end of said first shaft in said axial direction, and said second shaft is made of a tube and accommodates said rod portion therein,
   wherein said second yoke further comprises a cylindrical portion that is integrally formed with said second yoke and projects into said second shaft at a center of said second yoke for holding said rod portion, said cylindrical portion being accommodated in said second shaft, and said cylindrical portion comprises a bottom surface,
   wherein a gap is provided between an inner surface of said cylindrical portion and an outer surface of said rod portion so that no part of said rod portion touches said inner surface, and
   wherein said inner surface of said cylindrical portion is provided with a tapered surface, the taper of said surface narrowing toward said bottom surface.

2. A drive shaft for transmitting an engine revolution to a rear axle of a motor vehicle comprising:
   a first shaft;
   a first yoke fixed to an end of said first shaft;
   a second shaft;
   a second yoke fixed to an end of said second shaft, said second yoke being made of a press-formed metal plate; and
   a coupling provided between said first yoke and said second yoke, said coupling having a high-rigidity in a rotating direction of said drive shaft and having an elasticity in an axial direction of said drive shaft,
   wherein a first fixed portion is provided at which said second yoke is fixed to the end of said second shaft, and a second fixed portion is provided at which said second yoke is fixed to said coupling, said first fixed portion and said second fixed portion are provided at a same perpendicular plane to an axis of rotation,
   wherein said coupling comprises plural annular plates,
   wherein said first drive shaft further comprises a rod portion extending from said end of said first shaft in said axial direction, and said second shaft is made of a tube and accommodates said rod portion therein,
   wherein said second yoke further comprises a cylindrical portion that is integrally formed with said second yoke and projects into said second shaft at a center of said second yoke for holding said rod portion, said cylindrical portion being accommodated in said second shaft, and said cylindrical portion comprises a bottom surface,
   wherein said cylindrical portion I provided separately with said second yoke and fixed to said second yoke,
   wherein a gap is provided between an inner surface of said cylindrical portion and an outer surface of said rod portion so that no part of said rod portion touches said inner surface, and
   wherein said inner surface of said cylindrical portion is provided with a tapered surface, the taper of said surface narrowing toward said bottom surface.

3. A drive shaft for transmitting an engine revolution to a rear axle of a motor vehicle comprising:

a first shaft;

a first yoke fixed to an end of said first shaft;

a second shaft;

a second yoke fixed to an end of said second shaft, said second yoke being made of a press-formed metal plate; and a coupling provided between said first yoke and said second yoke, said coupling having a high-rigidity in a rotating direction of said drive shaft and having an elasticity in an axial direction of said drive shaft, wherein a first fixed portion is provided at which said second yoke is fixed to the end of said second shaft, and a second fixed portion is provided at which said second yoke is fixed to said coupling, said first fixed portion and said second fixed portion are provided at a same perpendicular plane to an axis of rotation, wherein said second yoke is fixed to the end of said second shaft by welding so that a surface of welding of said second yoke and said axial direction are perpendicular to each other, wherein said second shaft has an axially extended large diameter portion and an axially extended small diameter portion, and said second yoke is fixed to said large diameter portion of said second shaft, and wherein a convex portion whose diameter in said radial direction is larger than said large diameter portion is provided between said large diameter portion and said small diameter portion.

4. A drive shaft for transmitting an engine revolution to a rear axle of a motor vehicle comprising:

a first shaft;

a first yoke fixed to an end of said first shaft;

a second shaft;

a second yoke fixed to an end of said second shaft, said second yoke being made of a press-formed metal plate; and a coupling provided between said first yoke and said second yoke, said coupling having a high-rigidity in a rotating direction of said drive shaft and having an elasticity in an axial direction of said drive shaft, wherein a first fixed portion is provided at which said second yoke is fixed to the end of said second shaft, and a second fixed portion is provided at which said second yoke is fixed to said coupling, said first fixed portion and said second fixed portion are provided at a same perpendicular plane to an axis of rotation, wherein said coupling comprises plural annular plates, wherein said first drive shaft further comprises a rod portion extending from said end of said first shaft in said axial direction, and said second shaft is made of a tube and accommodates said rod portion therein, wherein said second yoke further comprises a cylindrical portion that is integrally formed with said second yoke and projects into said second shaft at a center of said second yoke for holding said rod portion, said cylindrical portion being accommodated in said second shaft, and said cylindrical portion comprises a bottom surface, wherein said second yoke is fixed to the end of said second shaft by welding so that a surface of welding of said second yoke and said axial direction are perpendicular to each other, wherein said second shaft has an axially extended large diameter portion and an axially extended small diameter portion, and said second yoke is fixed to said large diameter portion of said second shaft, and wherein a convex portion whose diameter in said radial direction is larger than said large diameter portion is provided between said large diameter portion and said small diameter portion.

* * * * *